United States Patent
Yoshida et al.

(10) Patent No.: US 8,802,274 B2
(45) Date of Patent: Aug. 12, 2014

(54) SECONDARY BATTERY MODULE AND SECONDARY BATTERY MODULE APPARATUS

(75) Inventors: Tadashi Yoshida, Hitachi (JP); Katsunori Nishimura, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 717 days.

(21) Appl. No.: 13/022,171

(22) Filed: Feb. 7, 2011

(65) Prior Publication Data

US 2011/0223452 A1  Sep. 15, 2011

(30) Foreign Application Priority Data

Feb. 25, 2010  (JP) ................................. 2010-039857

(51) Int. Cl.
- *H01M 2/00* (2006.01)
- *H01M 2/12* (2006.01)
- *H01M 10/50* (2006.01)
- *H01M 2/24* (2006.01)
- *H01M 6/42* (2006.01)

(52) U.S. Cl.
USPC ............. 429/148; 429/71; 429/120; 429/153; 429/159; 429/163

(58) Field of Classification Search
USPC .................... 429/148, 163, 71, 120, 158, 159
See application file for complete search history.

(56) References Cited

U.S. PATENT DOCUMENTS

| | | | | |
|---|---|---|---|---|
| 6,498,406 B1 * | 12/2002 | Horiuchi et al. | ............... | 307/150 |
| 7,531,269 B2 * | 5/2009 | Wegner | ......................... | 429/120 |
| 2004/0069620 A1 * | 4/2004 | Bitsche et al. | ............. | 204/228.6 |

FOREIGN PATENT DOCUMENTS

| | | |
|---|---|---|
| JP | 10-21891 A | 1/1998 |
| JP | 10-255859 A | 9/1998 |
| JP | 2003-109674 A | 4/2003 |
| JP | 3524237 B2 | 2/2004 |
| JP | 2007-207523 A | 8/2007 |

OTHER PUBLICATIONS

Japanese Office Action dated Apr. 24, 2012 with English translation (five (5) pages).

* cited by examiner

*Primary Examiner* — Patrick Ryan
*Assistant Examiner* — Julian Anthony
(74) *Attorney, Agent, or Firm* — Crowell & Moring LLP

(57) ABSTRACT

A secondary battery module comprises a casing in which vents are formed so as to allow outside air to flow in a vertical direction and one or more partition walls partition an internal space of the casing into a plurality of cell chambers. The partition wall comprises the pipe member as communication path to communicate between the cell chambers and the outside of the casing so as to allow outside air to be introduced into the internal space of the cell chambers. The secondary battery module further comprises a plurality of rod-shaped battery cells housed in the cell chambers and beams to support the battery cells along a horizontal direction and at predetermined intervals in the vertical direction in the cell chambers such that a cell axis direction is perpendicular to the vertical direction and extends along the partition wall.

17 Claims, 13 Drawing Sheets

SECONDARY BATTERY MODULE AND SECONDARY BATTERY MODULE APPARATUS

INCORPORATION BY REFERENCE

The disclosure of the following priority application is herein incorporated by reference: Japanese Patent Application No. 2010-039857 filed Feb. 25, 2010.

BACKGROUND OF THE INVENTION

1. Field of the Invention

The present invention relates to a secondary battery module including a plurality of rod-shaped battery cells arranged in a single casing, and a secondary battery module apparatus including such a plurality of secondary battery modules.

2. Description of the Related Art

With conventional techniques, lithium-ion secondary batteries have been employed in compact-sized devices such as personal computers, cellular phones, etc., because the lithium-ion secondary batteries provide a high power density. In recent years, such lithium-ion secondary batteries have begun to be employed in HEVs (hybrid vehicles) or EVs (electric vehicles). Also, such lithium-ion secondary batteries are anticipated to be employed as power smoothing rechargeable batteries in facilities for power generation such as solar power generation, wind power generation, etc., in which the power output is unstable.

In a case in which the secondary batteries are employed as such power storage rechargeable batteries, the power system includes a battery or a module assembly obtained by combining a plurality of unit batteries or cells. Power storage rechargeable batteries are known having capacities ranging from several kW up to several hundred kW or more. As the capacity of the rechargeable battery increases, the amount of heat generated by the cells becomes greater. Accordingly, there is a need to release the heat with high efficiency.

In general, in order to spread the secondary battery in usage of power storage rechargeable battery, the secondary battery modules are necessitated to be made with small size. In particular, in a case of employing a high power-density lithium-ion battery, there is a need to design such a module with a compact size in order to take the advantage of the high power-density lithium-ion battery. Furthermore, there is a demand for a compact module structure configured to reduce the irregularities in the temperature of the cells in the module. For example, a module structure of a battery module for an EV (electric vehicle) has been proposed as described in Japanese Patent Application Publication No. 3524237.

In the module structure described in Japanese Patent Application Publication No. 3524237, a plurality of cells in a casing are supported by ribs such that they are arranged along the horizontal direction, and vents are formed in a top casing and a bottom casing. Thus, the cells are cooled by air flowing through the casing in the vertical direction.

SUMMARY OF THE INVENTION

However, with the structure described in the aforementioned Patent document 1, only the cooling air that flows in the vertical direction in the battery casing contributes to the cooling of the cells. Accordingly, in a case in which a module is designed with a greater capacity, the number of cells is increased, i.e., the number of cells (cell stages) arranged particularly in the vertical direction is increased. In this case, the temperature of the cooling air becomes higher as it becomes closer to the top stage, and the cooling performance becomes lower. This leads to a problem in that the temperature of the cells becomes higher as the cells become closer to the top stage of the module.

A secondary battery module according to the present invention comprises a casing in which a plurality of vents are formed so as to allow outside air to flow in a vertical direction and at least one partition wall configured to partition an internal space of the casing into a plurality of cell chambers. The partition wall comprises a communication path configured to communicate between the cell chambers and the outside of the casing so as to allow outside air to be introduced into the internal space of the cell chambers. The secondary battery module further comprises a plurality of rod-shaped battery cells housed in the cell chambers and a support member configured to support the plurality of battery cells along a horizontal direction and at predetermined intervals in the vertical direction in the cell chambers such that a cell axis direction is perpendicular to the vertical direction and extends along the partition wall.

It is possible that the communication path is a pipe shaped member formed at the partition wall such that it extends along the cell axis direction and the pipe shaped member has openings at both its ends such that they are exposed to the outside of the casing and a plurality of holes facing the cell chamber.

A secondary battery module according to another present invention comprises a casing configured to house a plurality of battery cells and at least a first cell chamber and a second cell chamber partitioned by a partition plate within the casing, each extending in the vertical direction so as to accommodate the plurality of battery cells in a plurality of stages along the vertical direction, upper-side vents and lower-side vents provided to the casing and configured to allow outside air to flow through the first and second cell chambers in the vertical direction, and an outside air introduction path configured to introduce outside air acquired via outside air acquisition openings other than the lower-side vents into an intermediate stage on an outside air flow path via which outside air flows through the first and second cell chambers from the lower-side vents to the upper-side vents.

With the present invention, the uniformity of the temperature distribution in the casing is improved, thereby effectively cooling the respective battery cells arranged in a plurality of stages.

DESCRIPTION OF THE PREFERRED EMBODIMENTS

Description will be made regarding an embodiment of the present invention with reference to the drawings.

[First Embodiment]

Figure 1:
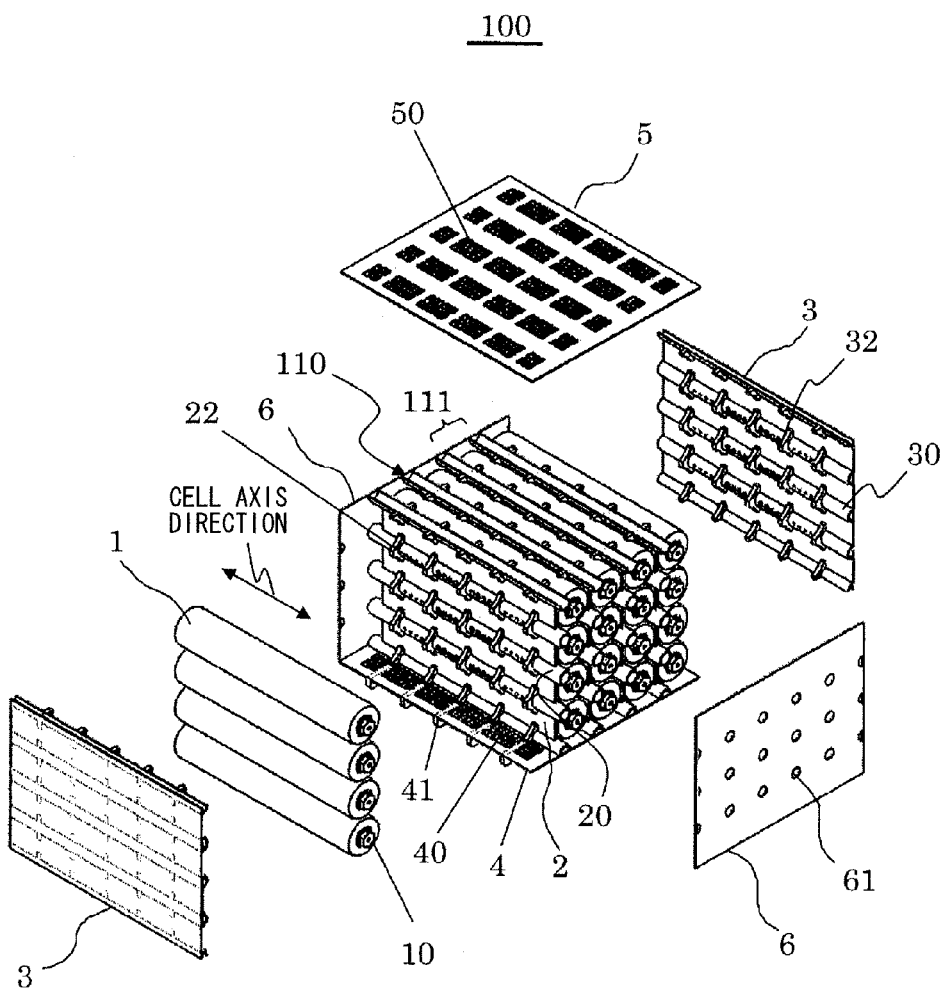
FIG. 1 is a disassembled perspective view showing a secondary battery module according to a first embodiment.

FIG. 1 is a disassembled perspective view showing a secondary battery module 100. The secondary battery module 100 according to the present embodiment is used to store electric power generated by solar power generation, wind power generation, etc., or is employed as a driving battery for an electric vehicle.

The secondary module 100 includes a casing 110 and a plurality of battery cells 1 housed in the casing 110. As shown in FIG. 1, the casing 110 has a configuration including a bottom panel 4 in which a plurality of vents 40 are formed, a top panel 5 in which a plurality of vents 50 are formed, a pair of side walls 3 (see FIG. 4) arranged on both sides of the battery cells 1 such that they extend along the longitudinal direction of the battery cells 1, a pair of end panels 6 arranged on both ends of the battery cells 1 such that they extend along the direction perpendicular to the cell longitudinal axis, and partition walls 2 (see FIG. 3) each arranged between the battery cells 1. A plurality of bars 41 are arranged on the outer face of the bottom panel 4.

The casing 110 is fabricated from an electrical insulating material such as synthetic resin or the like. Alternatively, the casing 110 may be fabricated using a material obtained by coating the surface of a metal member with an electrical insulating material such as resin or the like, or using a resin-molded metal panel or the like.

The battery cells 1 are arranged along a lateral or the horizontal direction in the casing 110. In an example shown in FIG. 1, groups of four battery cells 1 that are aligned in vertical (the top-to-bottom) direction are arranged in five columns in the side-wall direction. As the battery cells 1, lithium-ion cells, nickel hydride cells, nickel-cadmium cells, or the like are employed. Each battery cell 1 has an external shape like a rod (in the present embodiment, in a pipe shaped shape). Positive and negative terminals 10 are provided at both ends of each rod-shaped battery cell 1.

Figure 2:
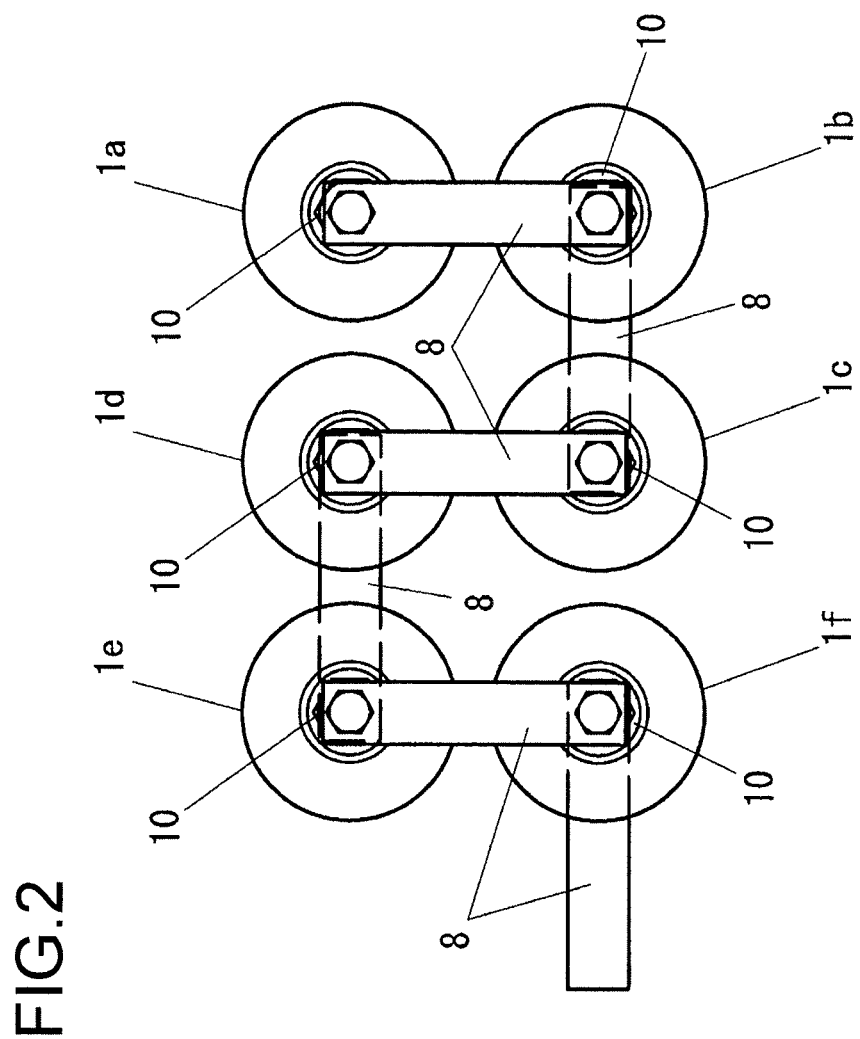
FIG. 2 is a diagram which shows an example of a connection structure by means of bus bars 8.

As shown in FIG. 2, the positive terminal 10 of each battery cell 1 is connected to the negative terminal 10 of a corresponding battery cell 1 via a bus bar 8, thereby connecting the plurality of battery cells 1 to each other, for example, in series, which is not shown in FIG. 1. FIG. 2 is a diagram showing an example of a connection structure using the bus bars 8, in which the battery cells 1a through 1f, which form the upper two stages, are connected in series. The terminals 10 on the side shown in FIG. 2 are connected to each other via bus bars 8 extending in the vertical direction. On the other hand, the terminals 10 on the opposite side are connected to each other via bus bars 8 extending in the horizontal direction. By making such a connection as described above, the six battery cells are connected in series in the order 1a, 1b, 1c, 1d, 1e and 1f.

Figure 3:
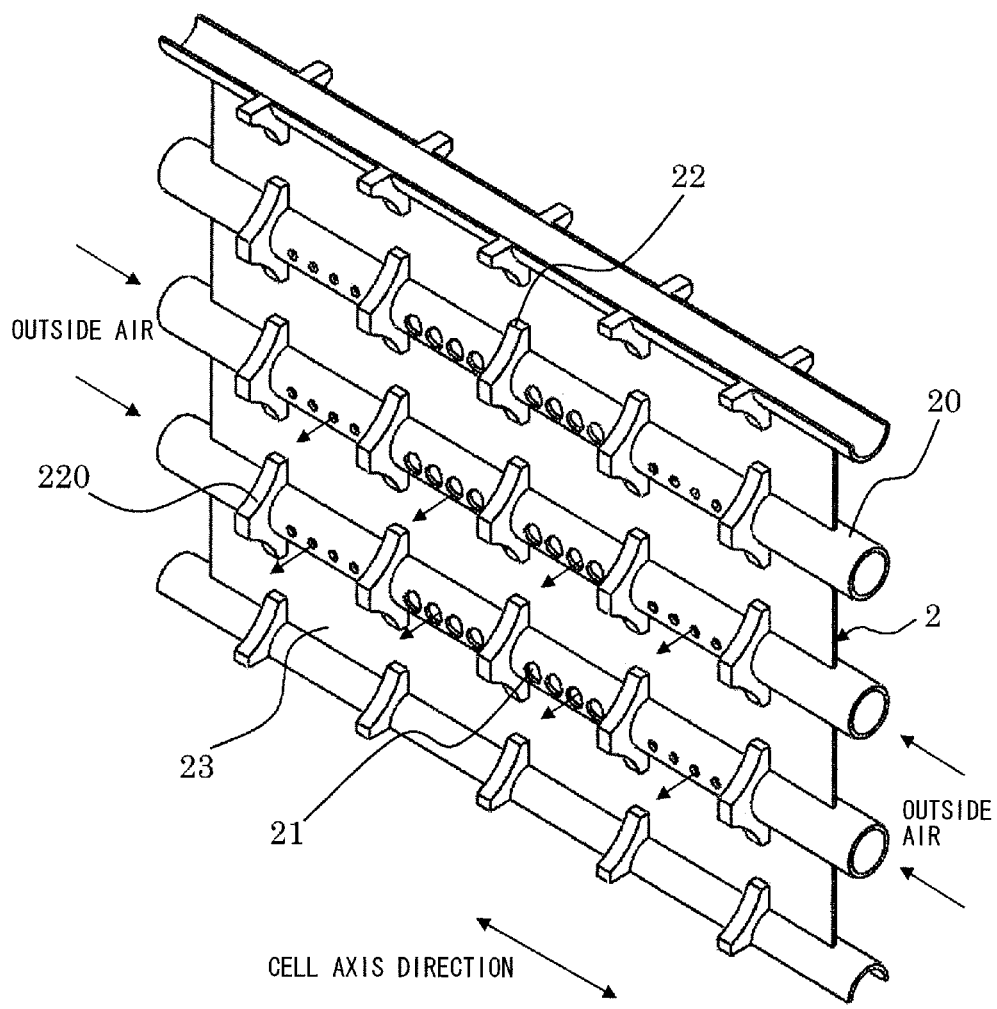
FIG. 3 is a perspective view of a partition wall 2.

As shown in FIG. 1, a partition wall 2, the structure of which is shown in detail in FIG. 3, is provided between vertically aligned battery cell groups adjacent to each other. The vents 40 and 50 formed in the bottom panel 4 and the top panel 5 are openings for air to flow in and flow out, respectively. The air in the casing is warmed by heat exchange with each battery cell 1, and the air thus warmed is discharged to outside the casing via the vents 50 formed in the top panel 5. Then, cool air from outside the casing flows in through the vents 40 formed in the bottom panel 4. As described above, each battery cell 1 is mainly cooled by air convection. It should be noted that an arrangement may be made in which air is forcibly supplied from the lower side of the bottom panel 4 using a cooling air generated by a fan or the like, or air flow generated when a vehicle is running.

Figure 4:
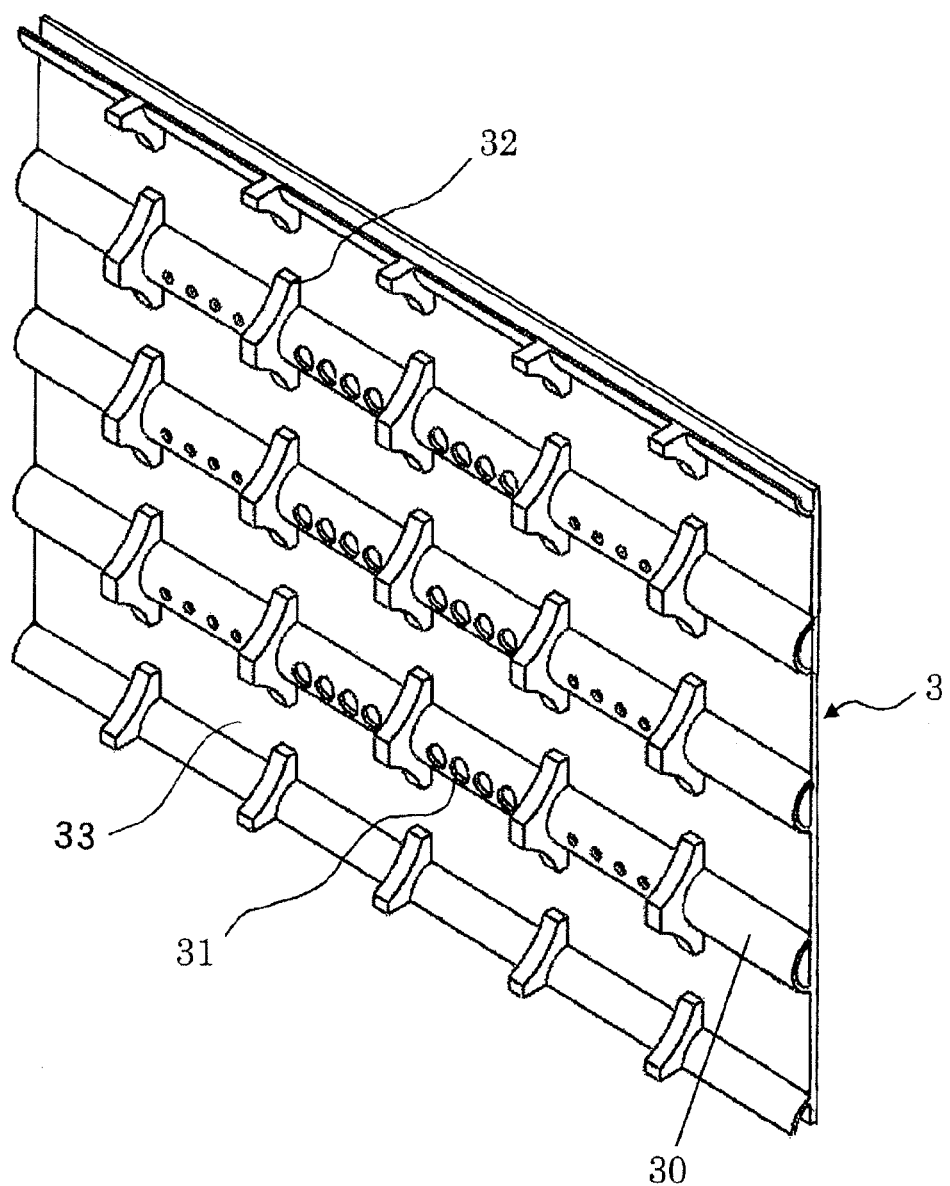
FIG. 4 is a perspective view of a side wall 3.

FIG. 3 is a perspective view showing the partition wall 2, and FIG. 4 is a perspective view showing the side wall 3. The partition wall 2 includes a flat plate member 23, pipe shaped members 20 formed in the shape of a cylinder, and beam members 22. The beam members 22 are arranged at respective positions on the front face and the back face of the partition wall 2. Each pipe shaped member 20 is formed such that it protrudes on both sides, i.e., from the front and back faces, of the partition wall 2. In other words, the flat plate member 23, which functions as a partition, is arranged between pipe shaped members 20 that are adjacent to one another in the vertical direction. A total of five pipe shaped members 20 are aligned along the vertical direction of the partition wall 2. The top portion is formed of only the lower half of a pipe shaped member 20 and the bottom portion is formed of only the upper half of a pipe shaped member 20.

The hollow portion of the pipe shaped member 20 communicates from one end to the other end, and is in communication with the outside of the casing 110 via openings 61 formed in the end panels 6. Thus, the pipe shaped members 20 and 30 each function as a path for introducing outside air. A plurality of discharging openings 21 that communicate with the hollow portion are formed at the circumferential surface in each pipe shaped member 20. Furthermore, at the circumferential surface 1, the plurality of beam members 22 supporting the battery cells 1 are arranged at intervals along the axis of the pipe shaped member 20. The battery cells 1 are mounted on arc-shaped faces 220 formed on the beam members 22. Specifically, as shown in FIG. 5, the battery cells 1 are supported by means of the a plurality of beam members 22 and 32 protruding from the opposite faces of a pair of adjacent partition walls 2.

In an example shown in FIG. 3, five beam members 22 are provided to each pipe shaped member 20. Four holes 21 are formed in each of four sections of the pipe shaped member 20 located between the beam members 22. The sizes of the four holes 21 formed in each of the middle two sections of these four sections, are larger than those of the four holes 21 formed in each of the outer sections. The holes in the middle sections with a larger size causes ample outside air introduced into the central sections of a cell chamber 111 (see FIG. 5 described later). Such an arrangement provides improved cooling efficiency in the central regions where the degree of temperature increase is relatively high, in comparison with the cooling efficiency in the edge regions. It should be noted that, although the holes 21 are not provided to the pipe shaped members 20 at the top and bottom ends of the partition wall 2 in the example shown in FIG. 3, thes holes 21 may also be provided.

On the other hand, the side wall 3 shown in FIG. 4 includes a flat plate member 33, pipe shaped members 30, and beam members 32. Unlike the partition wall 2, the pipe shaped members 30 and the beam members 32 are provided on only the inner-side surface of the side wall 3. The outer-side surface of the side wall 3 is formed as a flat surface. A plurality of holes 31 are formed in the pipe shaped members 30 in the same way as the pipe shaped members 20 of the partition wall 2.

Figure 5:
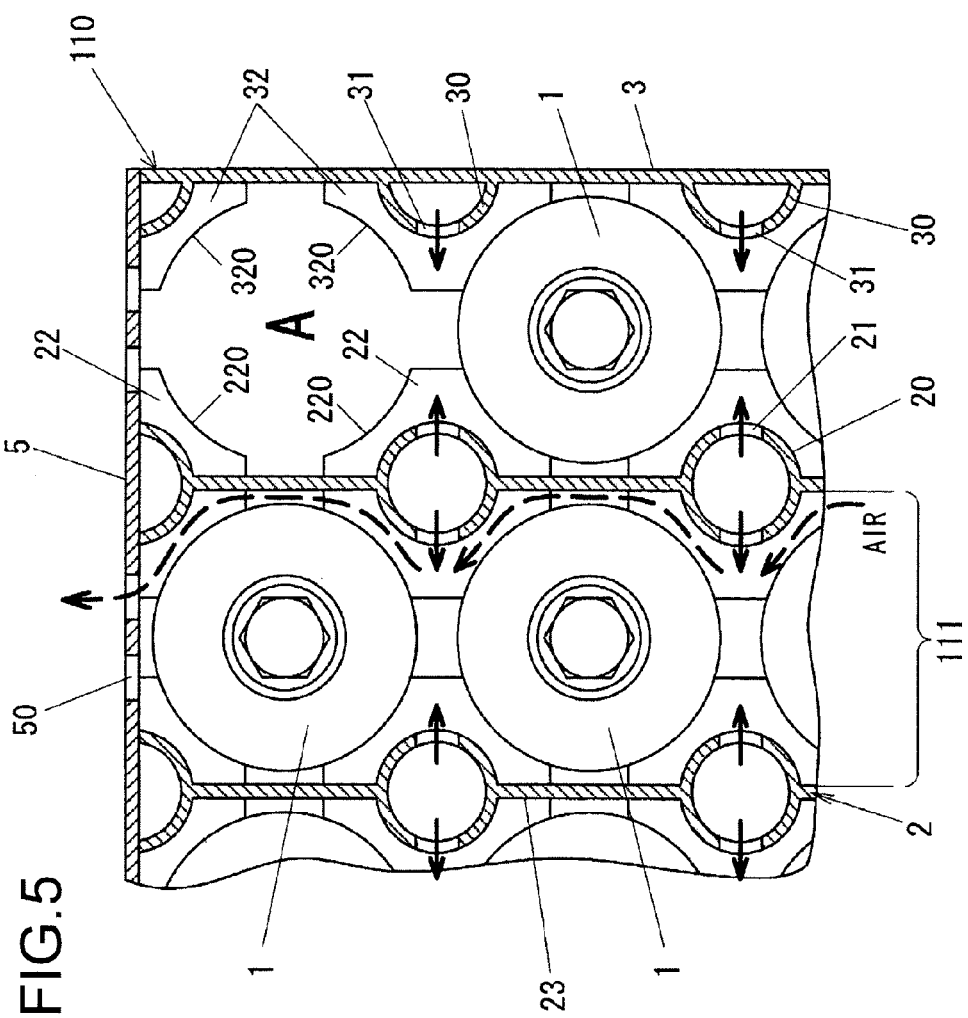
FIG. 5 is a diagram for describing the state in which battery cells 1 are housed.

FIG. 5 is a diagram for describing the state in which the battery cells 1 are housed, and is a cross-sectional view taken along the plane perpendicular to the longitudinal direction of the battery cell. It should be noted that the internal structure of each battery cell 1 is not shown in FIG. 5. Also, the battery cell 1 arranged at the uppermost right-side position is not shown for ease of understanding of the casing structure.

The internal space of the casing 110 is partitioned into a plurality of cell chambers 111 by opposing pairs of partition walls 2. In the example shown in FIG. 1, the internal space of the casing 110 is partitioned into five cell chambers 111 by four partition walls 2. Four vertically aligned battery cells 1 are arranged in each cell chamber 111. In each cell chamber 111, the battery cells 1 are supported by the beam members 22 and 32 at predetermined intervals. As shown in FIG. 5, each battery cell 1 is arranged along the horizontal direction such that it is inserted into a region A surrounded by the four beam members 22 and 32. Accordingly, in order to stably support the battery cell 1 by the beam members 22 and 32, the planes 220 and 320 used to mount the cell battery 1 are made to be arc-shaped.

The air warmed by the heat generated by the battery cells 1 rises through the gap between each cell 1 and the corresponding partition walls, and is discharged to outside the casing via the vents 50 formed in the top panel 5. Subsequently, outside air flows into the casing through the vents 40 (see FIG. 1) formed in the bottom panel 4. The dashed arrows in FIG. 5 indicate the direction of air flow, flowing in via the vents 40 and flowing out via the vents 50.

With the present embodiment, as described above, the partition wall 2 includes pipe shaped members 20 configured to introduce outside air into the casing 110. Thus, as the air rises along the partition wall 2 as shown by the dashed arrows in FIG. 5, the air in the internal space of the pipe shaped members 20 and 30 flows into the cell chamber 111 via the openings 21 and 22 formed in the pipe shaped members 20 and 30. As a result, outside air having a lower temperature flows into the pipe shaped member 20 and 30 via the openings 61 (see FIG. 1) formed in the end panels 6. That is to say, outside air is introduced via the pipe shaped members 20 and 30 into each of the cell chambers 111 housing the battery cells 1.

[Modification]

Figure 6:
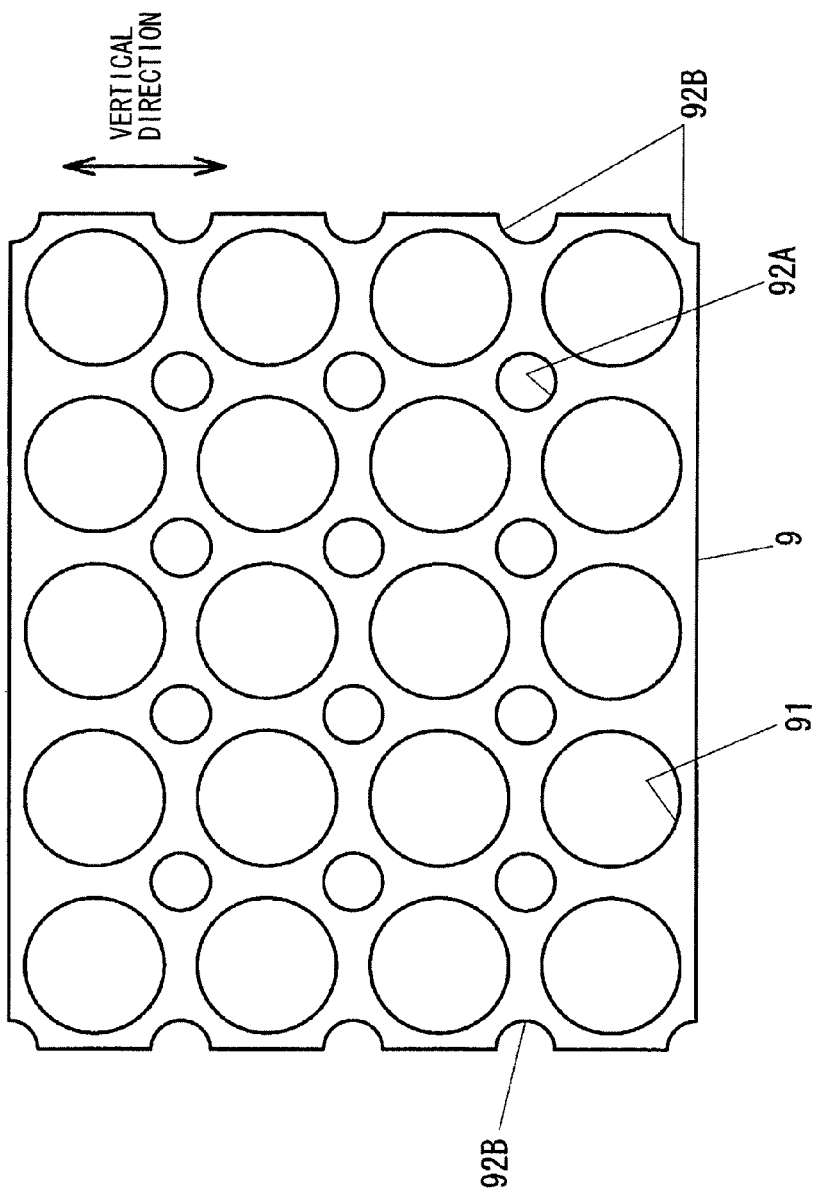
FIG. 6 is a plan view of a support plate 9.
Figure 7:
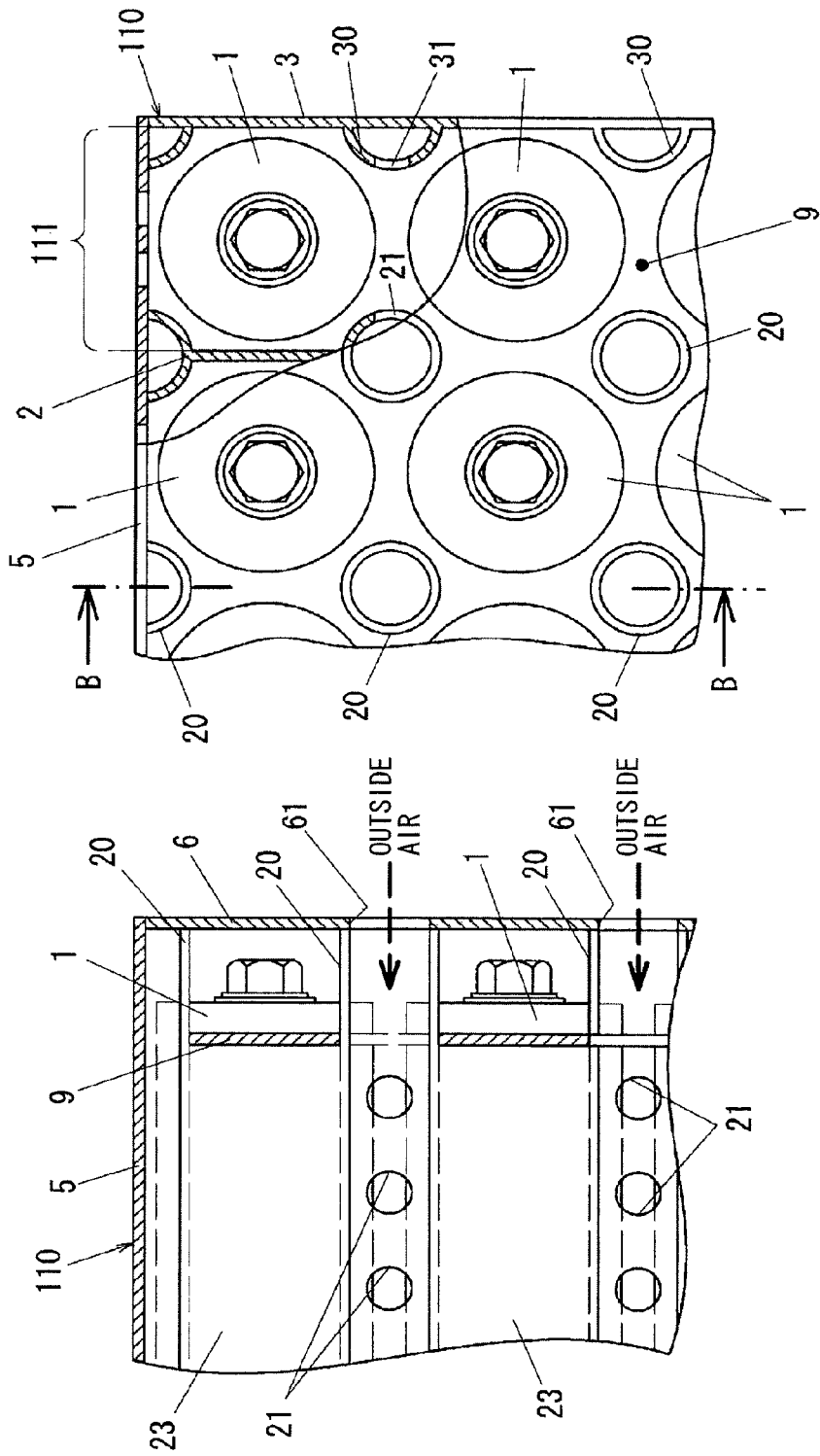
FIG. 7A is a diagram which shows the layout of the support plate 9, viewed from the cell axis direction.
FIG. 7B is a cross-sectional view taken along the line B-B in FIG. 7A.

FIGS. 6 and 7 are diagrams for describing a modification of the above-described first embodiment. In the above-described first embodiment, the battery cells 1 are supported by the plurality of beam members 22 and 32 arranged along the cell axis direction. In the modification, the twenty battery cells 1 are supported by a pair of support plates 9 arranged perpendicular to the cell axis.

FIG. 6 is a plan view of the support plate 9. The support plate 9 includes openings 91 each configured to permit insertion of a battery cell 1, and openings 92A each configured to permit insertion of a pipe shaped member 20. The openings 91 are formed in four rows in the vertical direction and five columns in the horizontal direction. Furthermore, notches 92B are formed in the left and right edges of the support plate 9 so as to permit insertion of pipe shaped members 30 arranged on the side walls 3.

FIGS. 7A and 7B show the support plate 9 as an internal component of the casing. FIG. 7A shows the same portion of the support plate 9 as that shown in FIG. 5. In FIG. 7A, the end panel 6 is not shown and a part of the support plate 9 is shown in cross-section. FIG. 7B is a cross-sectional view of the support plate 9 taken along the line B-B shown in FIG. 7A.

The support plates 9 are respectively arranged in the vicinity of both ends, i.e., the positive and negative terminals 10, of the battery cells 1, such that both ends of each battery cell 1 pass through respective openings 91 formed in the support plates 9 and protrude toward the respective sides of the end plates 6. As shown in FIG. 7A, each pipe shaped member 20 is arranged such that both of its ends pass through respective openings 92A formed in the support plates 9. Moreover, each pipe shaped member 30 provided to the side wall 3 is arranged such that both of its ends pass through respective openings 92B formed in the support plates 9. It should be noted that the length of each partition plate 23, which is arranged between the pipe shaped members 20, along the longitudinal direction is shorter than the gap between a pair of support plates 9.

The openings 21 are formed in each pipe shaped member 20 such that they are positioned between a pair of support plates 9. Four vertically aligned battery cells 1 are housed in a cell chamber 111 between a pair of partition walls 2, or in a cell chamber 111 between the partition wall 2 and the side wall 3. Outside air that flows into the pipe shaped members 20 via the openings 61 formed in the end panels 6 flows into the cell chambers 111 via the openings 21 formed in the circumferential face of the pipe shaped members 20.

As described above, the secondary battery module 100 includes a casing 110 having vents 40 and 50 via which air flows in the vertical direction of the casing, one or more partition walls 2 configured to partition the internal space of the casing 110 into a plurality of cell chambers 111, a plurality of rod-shaped battery cells 1 housed in the cell chambers 111, and beam members 22 and 32 configured to support the battery cells 1. The each partition wall 2 comprises the pipe shaped members 20 and each side wall 3 comprises pipe shaped members 30. The pipe shaped members 20 and 30 function as a communication path configured to communicate between each cell chamber 111 and the outside the casing, whereby outside air flows into the internal space of each cell chamber 111. Furthermore, the beam members 22 and 32 laterally support the plurality of battery cells 1 arranged within the cell chambers 111 at predetermined intervals along the top-to-bottom direction such that the cell axis direction is perpendicular to the top-to-bottom direction (vertical direction) of the casing and extends along the partition wall 2.

By making such a configuration, each battery cell 1 is cooled by outside air that flows in via the pipe shaped members 20 and 30, in addition to outside air that flows in via the vents 40 formed in the bottom panel 4. With the configuration as shown in FIG. 1 in which the battery cells 1 are arranged vertically in a plurality of stages, the air that flows in via the vents 40 is warmed by the heat generated by the battery cells 1. Accordingly, the temperature of the air becomes higher as the air rises in the casing 110. As a result, the cooling efficiency for the battery cells 1 arranged at the more upward stage becomes lower and the cooling efficiency in the central portion of the cell becomes lower as compared with the edges of the battery cell.

In contrast, with the present embodiment, outside air is directly introduced to the upper stage side of the cell chamber 111 and the central portion along the cell axis. Thus, such an arrangement provides improved cooling efficiency in the central portion of each cell chamber 111 along the cell axis. Furthermore, a uniform temperature distribution over the module can be attained. Moreover, by forming the holes 21 and 31 such that the size thereof becomes greater closer to the central portion of the pipe shaped members 20 and 30 along the cell axis, further improved uniformity in the temperature distribution can be attained. The degree to which the temperature rises in the central portion along the cell axis is greater than that at the cell edge.

Namely, with the secondary battery according to the first embodiment, particular discharging holes 21 and 31 are formed with a larger size in comparison with the size of the other holes, such that the rate of flow of outside air to be introduced into each cell chamber 111 is set to become greater as the temperature in a region of the battery cells 1 more readily rises. Alternatively it may be possible that the size of the whole holes remains the same and a number of the holes with the same size may be set to larger at the central portion compared with the edge portion of the pipe shaped member.

Furthermore, a structure is employed in which each battery cell 1 is supported by the beam members 22 formed on the partition wall 2 such that they protrudes toward the cell chamber 111. As a result, the heat generated by the battery cell 1 is released by heat conduction via the beam members 22. That is to say, each battery cell 1 is in contact with the bottom panel 4, the top panel 5, and the end panels 6, each of which functions as an external wall of the casing. In addition, the partition walls 2, each having pipe shaped members 20 via which outside air flows, can be used as a heat sink. Thus, such an arrangement provides the further improved cooling efficiency.

It should be noted that, by forming each partition wall 2 using a member obtained by coating the surface of a material member with an electrical insulating material, such an arrangement provides the partition walls 2 with a further improved heat sink function.

[Second Embodiment]

FIG. 8 through FIG. 11 are diagrams showing a second embodiment. The structures of the partition wall 2 and the side wall 3 according to the second embodiment differ from those of the first embodiment. Accordingly, description will be made below mainly regarding the partition wall 2 and the side wall 3.

Figure 8:
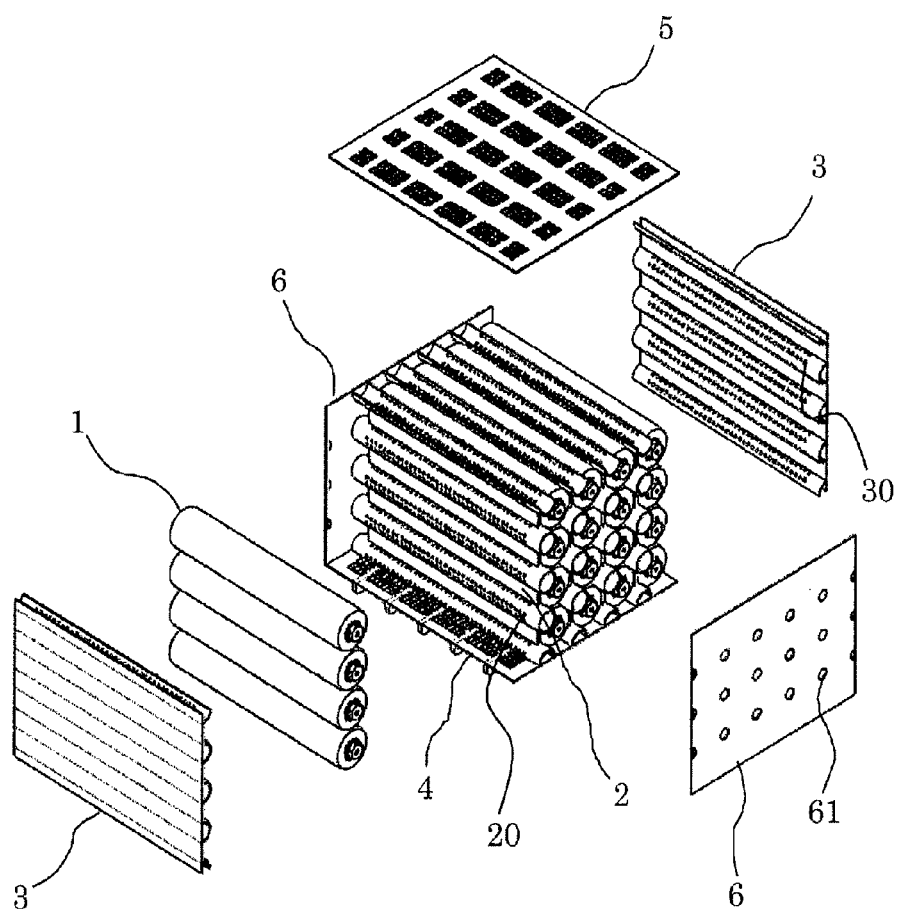
FIG. 8 is a disassembled perspective view of a secondary battery module 100 according to a second embodiment.
Figure 9:
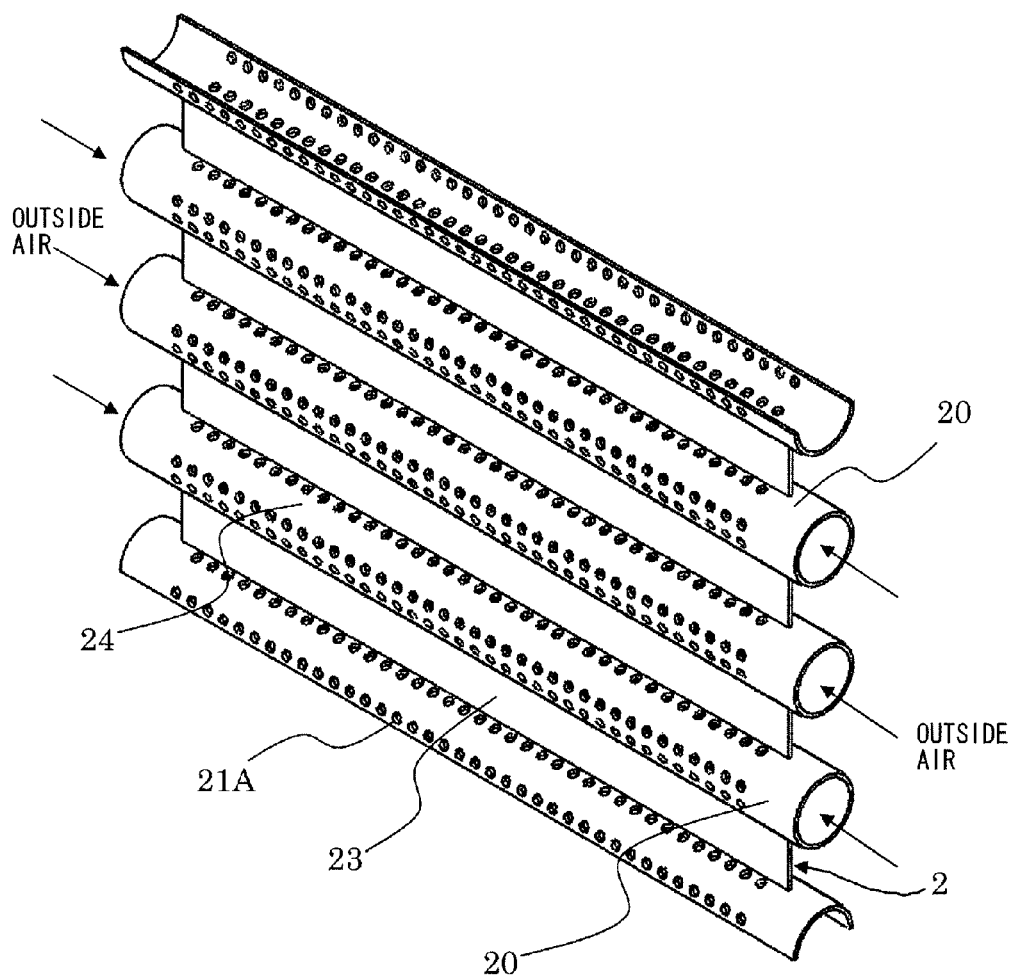
FIG. 9 is a perspective view of a partition wall 2.
Figure 10:
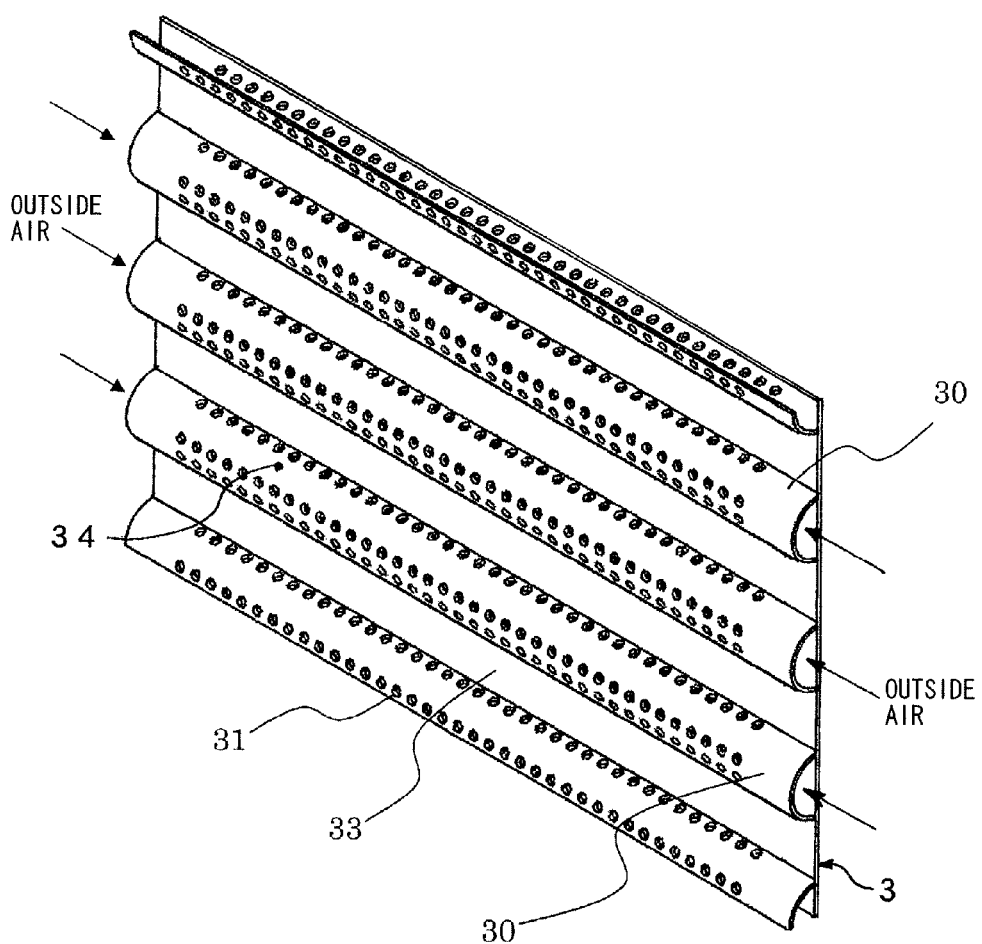
FIG. 10 is a perspective view of a side wall 3.

FIG. 8 is a disassembled perspective view of the secondary module 100. FIG. 9 is a perspective view of the partition wall 2, and FIG. 10 is a perspective view of the side wall 3. As shown in FIGS. 9 and 10, the partition wall 2 and the side wall 3 according to the present embodiment have no beam member 22 that functions as a dedicated battery cell support member as shown in FIGS. 2 and 3. With the present embodiment, the pipe shaped members 20 and 30 formed in the partition wall 2 and the side wall 3 provide an additional function as an support member configured to support the cell battery 1. Namely, as shown in FIG. 8, the cell batteries 1 are supported by the circumferential faces (circumferential faces 24 and 34 shown in FIGS. 9 and 10) of the pipe shaped members 20 and 30.

Figure 11:
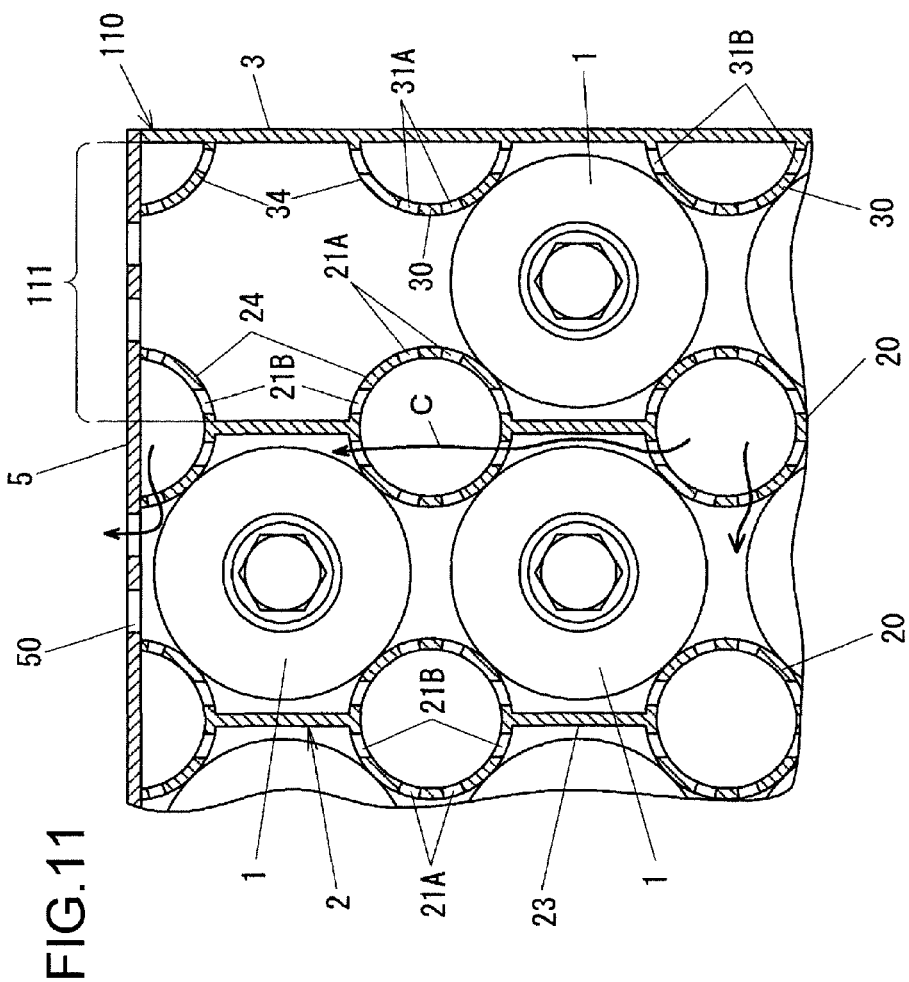
FIG. 11 is a diagram which shows the layout of the cell batteries 1 in a casing 110.

FIG. 11 is a diagram showing battery cells 1 supported by the pipe shaped members 20, and the flow of outside air flowing into the cell chamber. FIG. 11 shows the same case as in FIG. 5 described above. The battery cell 1 arranged at the uppermost right-side position is not shown for ease of understanding of the casing structure. The battery cells 1 are supported by the circumferential faces 24 and 34 of the pipe shaped members 20 and 30. Openings 21A and 31A are provided laterally in the circumferential walls of the pipe shaped members 20 and 30. Furthermore, openings 21B and 31B are provided vertically in the circumferential walls of the pipe shaped members 20 and 30. Outside air that flows into the cell chamber via the openings 21A, 21B, 31A, and 31B of the pipe shaped members 20 and 30 is warmed by the battery cell 1. The air thus warmed rises in the cell chamber and flows into the pipe shaped member 20 or 30 immediately above, then flows out into the cell chamber 111 again. Such a flow is repeated, and the air is discharged to outside the casing via the vents 50 formed in the top panel 5 in the final stage.

Thus, the arrangement described above provides a simple structure and allows the pipe shaped members 20 and 30, which are pipe-shaped structure, to be formed with a greater outer diameter than that of the first embodiment. As a result, a cooling air flow performance in the pipe shaped structure is improved, thereby further improving the uniformity of the temperature distribution over the module. Furthermore, by means of the openings 21B and 31B provided vertically on the circumferential wall of each pipe shaped member, s air flow in the vertical direction of the cell chamber can be realized and cooling air flow is formed as indicated by the arrow C.

It should be noted that, in the first embodiment, a space is formed between the beam members 22 and between the beam members 32 arranged in parallel along the axis so as to communicate from the bottom panel 4 to the top panel 5, thereby allowing outside air to flow through the cell chamber 111 from the lower side to the upper side by means of convection flow. With such an arrangement, due to the rising air that flows in the cell chamber 111, additional cooling air is introduced into the cell chamber 111 via the openings 21 and 31 of the pipe shaped members 20 and 30. In contrast, with the second embodiment, the cell chamber 111 is partitioned by the circumferential faces of the battery cells 1 arranged along the vertical direction such that the air is prevented from directly flowing through the cell chamber in the vertical direction. Thus, almost the whole quantity of cooling air flows into the cell chamber 111 via the pipe shaped members 20 and 30 and flows out from the cell chamber 111 pipe shaped.

Furthermore, the second embodiment described above provides another effect and advantage described below. As shown in FIG. 11, the second embodiment employs a structure in which the pipe shaped members 20 and 30 having the respective openings 21A, 21B, 31A and 31B are arranged such that the circumferential faces 24 and 34 protrude into the cell chamber 11 as shown in FIG. 11, whereby the circumferential faces 24 and 34 also function as support members for the battery cells 1. By making such a structure, there is no need to provide additional support members and a diameter of the pipe shaped members 20 and 30 can increase, thereby increasing the flow of outside air that flows in via the pipe shaped members 20 and 30.

[Third Embodiment]

Figure 12:
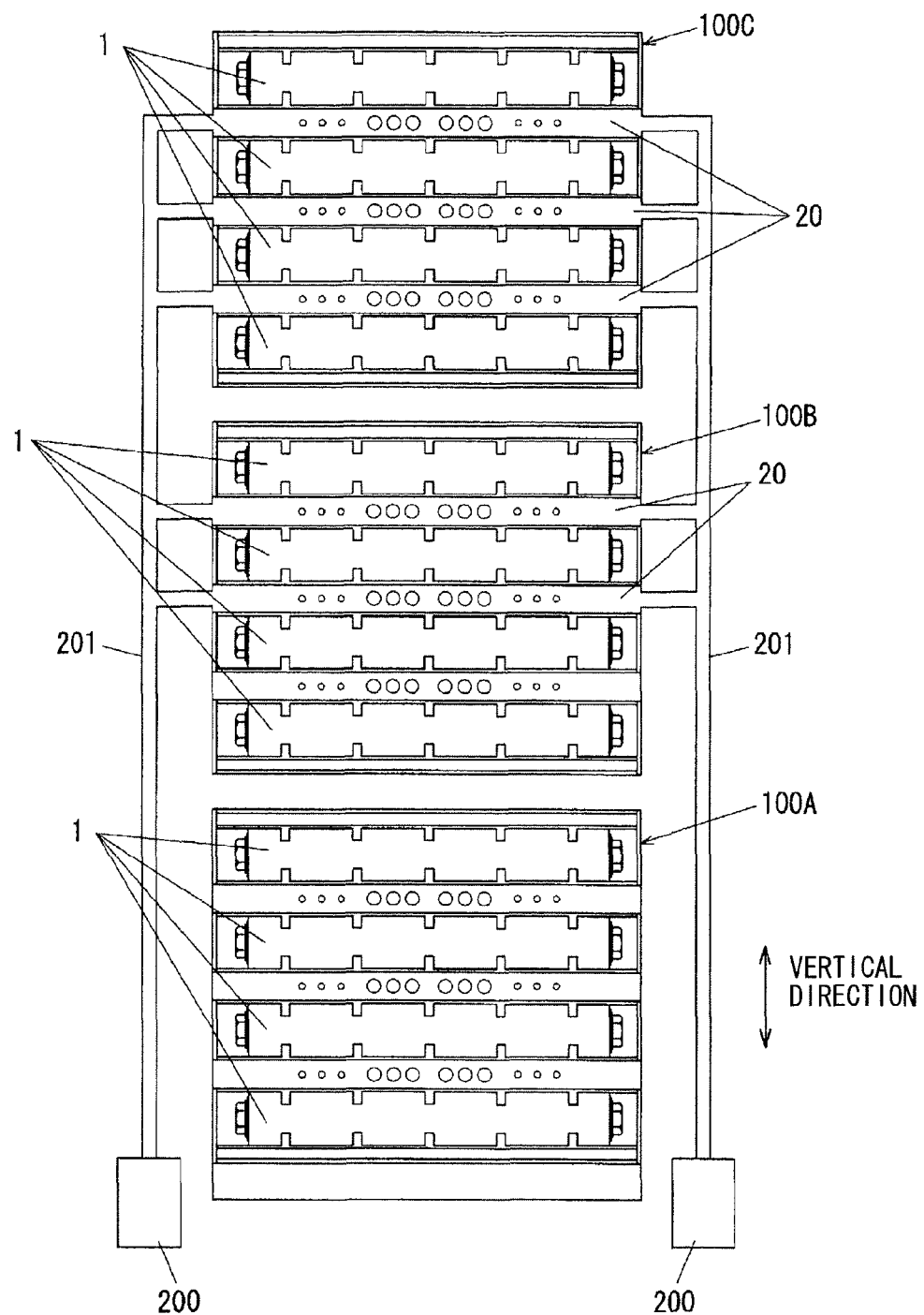
FIG. 12 is a diagram which shows a secondary battery module apparatus according to a third embodiment.

FIG. 12 is a cross-sectional diagram showing a secondary battery module apparatus 1000 having a structure in which the secondary battery modules 100 shown in FIG. 1 are stacked in three stages. In a case in which secondary battery modules 100A, 100B, and 100C, each housing battery cells 1, are stacked as described above, the air warmed by the battery cells 1 housed in the lower casing flows into the second stage and third stage secondary battery modules 100B and 100C via the vents 40 of the bottom panels 4 (see FIG. 1), leading to a problem of reduced cooling performance. In order to solve such a problem, the third embodiment employs an air blower 200 to forcibly supply outside air to the pipe shaped members 20 and 30.

In an example shown in FIG. 12, pipes 201 are connected from the air blowers 201 to the pipe shaped members 20 and 30 arranged at the second and third stages from the bottom of the second-stage secondary battery module 100B, and to the pipe shaped members 20 and 30 arranged at the first through third stages of the third-stage secondary battery module 100C. By making such a structure, outside air is forcibly supplied to the pipe shaped members 20 and 30, thereby increasing the flow of outside air via the pipe shaped members 20 and 30 in comparison with an arrangement employing a natural flow of outside air. Thus, such an arrangement provides improved battery cell cooling performance in the second-stage and third-stage secondary battery modules 100B and 100C.

Description has been made with reference to FIG. 12 regarding an arrangement in which the air blowers 200 are respectively provided to the left and right pipes 201. Also, an arrangement may be made including a single air blower 200 in which the left and right pipes 201 are combined into a single pipe immediately before the air blower 200.

In the example as shown in FIG. 12, a plurality of secondary battery modules 100 are stacked in a plurality of stages. In a case in which the number of stages of the battery cells 1 housed in the single secondary battery module 100 is large, the same concept can also be applied to the single secondary battery module 100 in the same way. That is to say, an arrangement may be made in which outside air is forcibly supplied using air blowers 200 to pipe shaped members 20 and 30 arranged on the upper side of the secondary battery module 100.

With the structure as in the third embodiment, it is ensured that the cooling air is supplied to the pipe shaped members 20 and 30, thereby improving the cooling efficiency. In particular, in a case in which a plurality of casings 100A through 100C are stacked as shown in FIG. 12, since the temperature of the battery cells 1 more readily rises as the cells become closer to the casing on the upper side, connecting the pipes 201 to the pipe shaped members 20 and 30 is effective to improve cooling efficiency.

Figure 13:
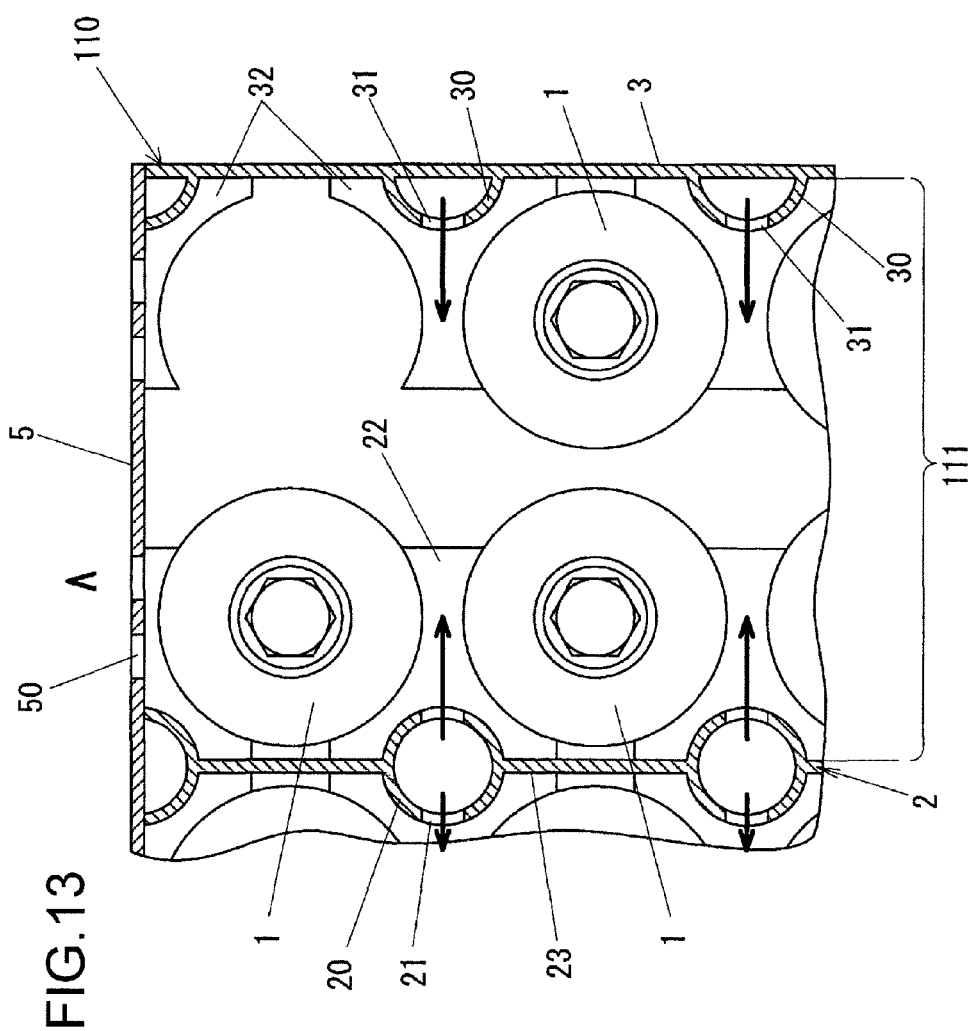
FIG. 13 is a diagram which shows an arrangement in which the cell batteries 1 are arranged in two rows in a cell chamber 111.

In the embodiment described abode, the battery cells 1 are arranged and aligned in a single row in the vertical direction in the cell chamber. Alternatively, the battery cells 1 may be arranged in a plurality of rows. For example, as shown in FIG. 13, the cell batteries 1 may be provided in two rows in a single cell chamber 111. Each cell battery 1 is supported on one side by beam members 22 or 32 provided to a partition wall 2 or side wall 3.

Also, the openings 21 and 31 may be formed in the pipe shaped members 20 and 30 in a circular shape as noted above or in the shape of a slit. Furthermore, the pipe shaped members 20 and 30 may be provided to only the upper-side portion of the partition wall 2 and the side wall 3. It is also possible that the shape of each pipe shaped member 20 is not restricted to a pipe shaped shape. For example, the pipe shaped member 20 may be formed with a rhomboid cross-section.

Furthermore, the present invention may be applied to a secondary battery module including at least two cell chambers 111 arranged side-by-side on the left and right. Each cell chamber 111 should house two or more stages of stacked battery cells 1.

Description has been made regarding the partition wall 2 formed of the a plurality of pipe shaped members 20 and the flat plate 23. However, an arrangement may be made in which a partition plate is provided extending within the internal space of the casing 1 in the up to bottom direction so as to define the cell chambers 111 and communication paths 20 are provided to both faces of the partition plate.

Each embodiment described above may be used as an single arrangement or a combination of the a plurality of embodiments. This is because the respective effects of the embodiments can be accomplished singly and in combination. Also, the present invention is by no means intended to be restricted to the above-described embodiments without departing from the features of the present invention.

In other words, the present invention can be applied to various kinds of secondary battery modules having a mechanism for introducing outside air into the cell chamber, other than outside air rising in the cell chamber by natural convection. Thus, a secondary battery module to which the present invention can be applied comprises, a casing 110 configured to house a plurality of battery cells 1, at least first and second cell chambers 111 partitioned by a partition plate, which are cell chambers extending along the vertical direction in the casing so as to house a plurality of battery cells arranged in a plurality of stages along the vertical direction, lower vents 40 and upper vents 50 provided to the casing 110 so as to allow outside air to circulate in the vertical direction in the first and second cell chambers 111; and outside air introduction paths 20 and 30 configured to introduce outside air acquired via outside air acquisition openings 61 other than the lower vents 40 to an intermediate stage on the path for outside air that flows through the first and second cell chambers 111 from the lower vents 40 to the upper vents 50.

The above described embodiments are examples, and various modifications can be made without departing from the scope of the invention.

What is claimed is:

1. A secondary battery module comprising:
a casing in which a plurality of vents are formed so as to allow outside air to flow in a vertical direction;
at least one partition wall configured to partition an internal space of the casing into a plurality of cell chambers;
a plurality of rod-shaped battery cells housed in the cell chambers; and
pipe shaped members that are aligned along the vertical direction of the casing, wherein each of the pipe shaped members: i) extends along an axis direction of the battery cells, and ii) has a plurality of holes facing the cell chambers, wherein the partition wall comprises:
  a communication path configured to communicate between the cell chambers and the outside of the casing so as to allow outside air to be introduced into the internal space of the cell chambers; and
  a support member configured to support the plurality of battery cells along a horizontal direction and at predetermined intervals in the vertical direction in the cell chambers such that the axis direction is perpendicular to the vertical direction and extends along the partition wall.

2. A secondary battery module according to claim 1, wherein
the communication path is the pipe shaped member formed at the partition wall, and
the pipe shaped member has openings at both its ends such that they are exposed to the outside of the casing.

3. A secondary battery module according to claim 2, wherein
the plurality holes are formed with an increased size as they become closer to a central portion of the pipe shaped member along the axis direction.

4. A secondary battery module according to claim 3, wherein
the pipe shaped member has a circumferential face in which the plurality of holes are formed and which protrudes toward the cell chamber and
a part of the circumferential face functions as the support member.

5. A secondary battery module according to claim 2, wherein
the pipe shaped member has a circumferential face in which the plurality of holes are formed and which protrudes toward the cell chamber and
a part of the circumferential face functions as the support member.

6. A secondary battery module according to claim 1, wherein
the support member is a protrusion formed on the partition wall such that it protrudes toward the cell chamber.

7. A secondary battery module according to claim 1, wherein
the partition wall is formed of a member obtained by coating a surface of a metal member with an electrical insulating material.

8. A secondary battery module according to claim 1, wherein
a plurality of the communication paths are formed and
at least one of the plurality of communication paths is connected to a pipe configured to supply air by means of an air supplying unit.

9. A secondary battery module apparatus comprising:
a plurality of secondary battery modules stacked in a vertical direction, each of the plurality of secondary battery modules comprising:
a casing in which a plurality of vents are formed so as to allow outside air to flow in a vertical direction;
at least one partition wall configured to partition an internal space of the casing into a plurality of cell chambers; and
a plurality of rod-shaped battery cells housed in the cell chambers, wherein the partition wall comprises:
a communication path configured to communicate between the cell chambers and the outside of the casing so as to allow outside air to be introduced into the internal space of the cell chambers;
a support member configured to support the plurality of battery cells along a horizontal direction and at predetermined intervals in the vertical direction in the cell chambers such that a cell axis direction is perpendicular to the vertical direction and extends along the partition wall, wherein
the communication path of at least one of the secondary battery modules, other than a lowermost stage secondary battery module, is connected to a pipe configured to supply air by means of an air supplying unit.

10. The secondary module according to claim 9, further comprising:
pipe shaped members that are aligned along the vertical direction of the casing, wherein each of the pipe shaped members:
extends along an axis direction of the battery cells, and has a plurality of holes facing the cell chambers.

11. A secondary battery module comprising:
a casing configured to house a plurality of battery cells;
at least a first cell chamber and a second cell chamber partitioned by a partition plate within the casing, each extending in the vertical direction so as to accommodate the plurality of battery cells in a plurality of stages along the vertical direction;
upper-side vents and lower-side vents provided to the casing and configured to allow outside air to flow through the first and second cell chambers in the vertical direction; and
an outside air introduction path configured to introduce outside air acquired via outside air acquisition openings other than the lower-side vents into an intermediate stage on an outside air flow path via which outside air flows through the first and second cell chambers from the lower-side vents to the upper-side vents.

12. A secondary battery module according to claim 11, wherein
the outside air introduction path comprises a pipe provided to the casing such that it extends along the longitudinal direction of the battery cells and crosses the first and second cell chambers and
the pipe is provided with discharging openings arranged at predetermined intervals along the longitudinal direction to introduce outside air to the first and second cell chambers.

13. A secondary battery module according to claim 12 wherein
the shape and number of the discharging openings are set such that flow rate of outside air to be introduced to the first and second cell chambers from the discharging openings becomes greater in a region where the temperature of the battery cell more readily rises.

14. A secondary battery module according to claim 12, wherein
the pipe is integrally provided to the partition plate and also provided to inner faces of a pair of side panels that form the casing, the inner faces opposing to the partition plate.

15. A secondary battery module according to claim 12, wherein
the pipe is arranged so as to introduce additional outside air via a gap between a pair of battery cells arranged adjacent to one another in the vertical direction from among a plurality of battery cells arranged in a plurality of stages in the vertical direction.

16. A secondary battery module according to claim 15, wherein
the battery cells arranged in the plurality of stages in the vertical direction in at least a first cell chamber and a second cell chamber are supported by circumferential faces of the pipe arranged such that they protrude from both faces of the partition plate and by circumferential faces of the pipe arranged such that they protrude from the inner faces of the pair of side panels that form the casing.

17. A secondary battery module apparatus comprising:
a plurality of secondary battery modules according to claim 11 stacked in a plurality of stages in the vertical direction; and
an air supplying apparatus configured to forcibly introduce outside air via a pipe to the outside air introduction path for at least one secondary battery module other than the lowermost stage secondary battery module.

* * * * *